United States Patent
Enomoto et al.

(10) Patent No.: US 11,958,420 B2
(45) Date of Patent: Apr. 16, 2024

(54) PROTECTOR AND WIRE HARNESS

(71) Applicant: Yazaki Corporation, Tokyo (JP)

(72) Inventors: Satoshi Enomoto, Tochigi (JP); Tomokazu Kato, Tochigi (JP); Yoshio Shionome, Tochigi (JP); Shinichi Tadokoro, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 220 days.

(21) Appl. No.: 17/832,959

(22) Filed: Jun. 6, 2022

(65) Prior Publication Data
US 2022/0396221 A1 Dec. 15, 2022

(30) Foreign Application Priority Data
Jun. 10, 2021 (JP) ................. 2021-097079

(51) Int. Cl.
B60R 16/02 (2006.01)
(52) U.S. Cl.
CPC ................. B60R 16/0215 (2013.01)
(58) Field of Classification Search
CPC .................................. B60R 16/0215
USPC ....................................... 174/72 A
See application file for complete search history.

(56) References Cited

U.S. PATENT DOCUMENTS

| 6,229,091 B1* | 5/2001 | Ogawa | ................. B60R 16/0215 174/72 A |
| 7,533,853 B2* | 5/2009 | Ogawa | ................. F16L 3/06 248/74.1 |
| 2008/0023223 A1* | 1/2008 | Suzuki | ................. H02G 3/0481 174/72 A |
| 2014/0166825 A1* | 6/2014 | Shiga | ................. H02G 3/32 248/74.2 |

FOREIGN PATENT DOCUMENTS

| JP | 2015-053753 A | 3/2015 |
| JP | 2016-163433 A | 9/2016 |

* cited by examiner

Primary Examiner — Timothy J Thompson
Assistant Examiner — Michael F McAllister
(74) Attorney, Agent, or Firm — Sughrue Mion, PLLC

(57) ABSTRACT

A wire harness includes a wiring member, an exterior member through which the wiring member is inserted, and a protector that is fixed to a vehicle and holds the exterior member. The protector includes a holding member that holds the exterior member, a fixing member that is fixed to the vehicle, and a tubular member that is formed in a tubular shape and on which the holding member and the fixing member are disposed. At least one of the holding member or the fixing member includes a columnar structure that is formed in a columnar shape and is slidingly fittable into the tubular member.

9 Claims, 7 Drawing Sheets

PROTECTOR AND WIRE HARNESS

CROSS-REFERENCE TO RELATED APPLICATION(S)

The present application claims priority to and incorporates by reference the entire contents of Japanese Patent Application No. 2021-097079 filed in Japan on Jun. 10, 2021.

BACKGROUND OF THE INVENTION

1. Field of the Invention

The present invention relates to a protector and a wire harness.

2. Description of the Related Art

For example, Japanese Patent Application Laid-open No. 2015-53753 discloses a wire harness including a wire harness body and a plurality of harness holding members. Each of the harness holding members includes a linear holding portion that linearly holds part of the wire harness body, and a fixing portion that fixes the linear holding portion to a vehicle. The harness holding members are attached to the wire harness body with a space left at a position corresponding to a curved path portion.

The wire harness described in Japanese Patent Application Laid-open No. 2015-53753 still has room for improvement in terms of enhancing versatility in order to be compatible with, for example, a variety of vehicle models and specifications.

SUMMARY OF THE INVENTION

The present invention has been made in view of the above circumstances, and it is an object thereof to provide a protector and a wire harness capable of enhancing versatility.

In order to achieve the above mentioned object, a protector according to one aspect of the present invention includes a holding member that holds an exterior member through which a wiring member is inserted; a fixing member that is fixed to a vehicle; and a tubular member that is formed in a tubular shape and on which the holding member and the fixing member are disposed, wherein at least one of the holding member or the fixing member includes a columnar structure that is formed in a columnar shape and is slidingly fittable into the tubular member.

In order to achieve the above mentioned object, a wire harness according to another aspect of the present invention includes a wiring member; an exterior member through which the wiring member is inserted; and a protector that is fixed to a vehicle and holds the exterior member, wherein the protector includes: a holding member that holds the exterior member; a fixing member that is fixed to the vehicle; and a tubular member that is formed in a tubular shape and on which the holding member and the fixing member are disposed, and at least one of the holding member or the fixing member includes a columnar structure that is formed in a columnar shape and is slidingly fittable into the tubular member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail based on the drawings. Note that the embodiment does not intend to limit the present invention. Additionally, constituent elements in the following embodiment include those replaceable and easily made by a person skilled in the art, or those substantially identical with the constituent elements.

In FIGS. 1, 8, 9, and 10, which will be described below, part of a wiring member is simply illustrated using two-dot chain lines, while the wiring member is omitted in the other drawings. Similarly, in FIGS. 1, 8, 9, and 10, part of an exterior member is simply illustrated using solid lines, while the exterior member is omitted in the other drawings.

Embodiment

Figure 1:
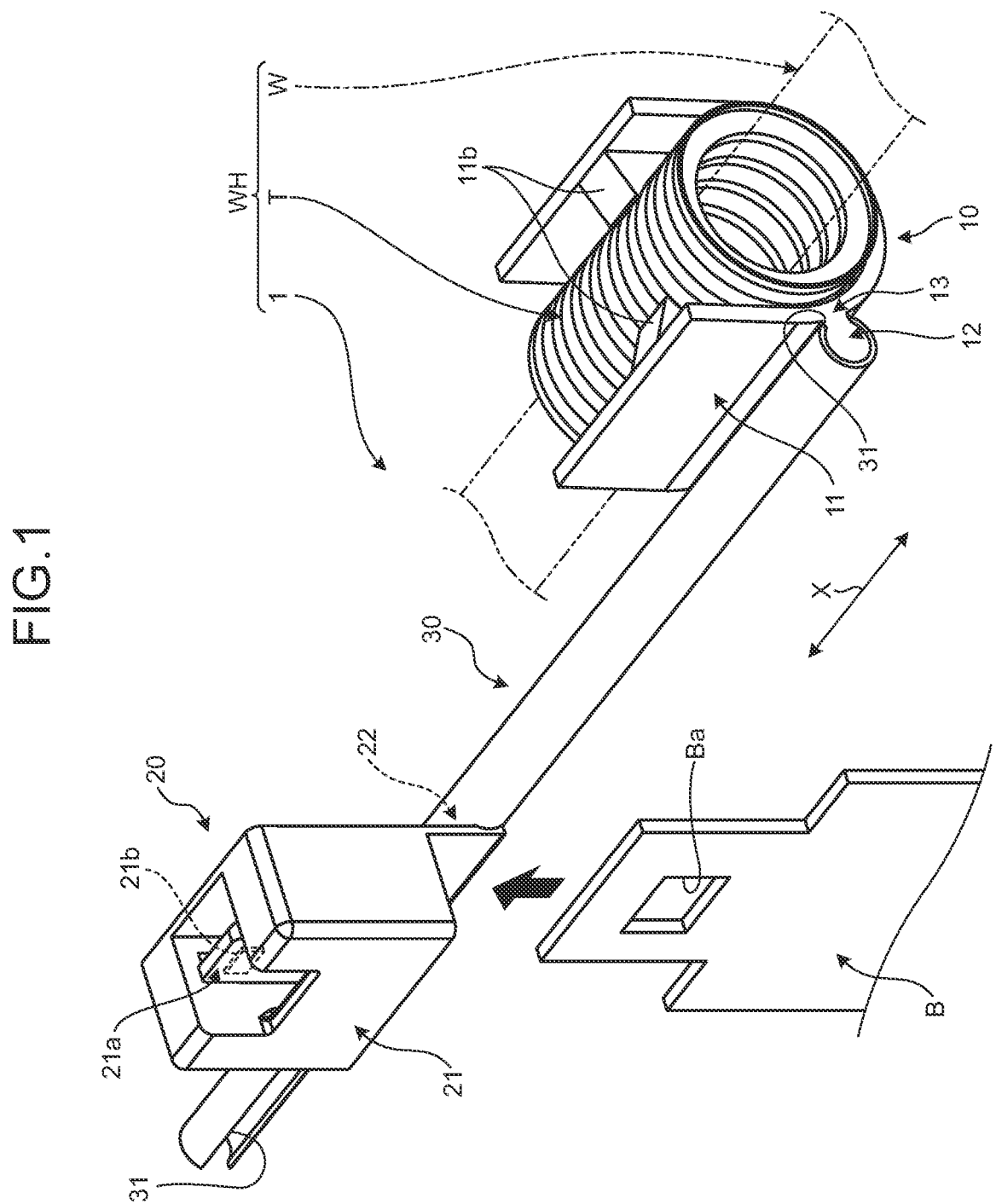
FIG. 1 is a schematic perspective view illustrating a schematic configuration of a wire harness according to an embodiment.

A protector 1 illustrated in FIG. 1 is incorporated in a wire harness WH that is mounted in a vehicle or the like, and is attached to a wiring member W having conductivity. For example, in order to connect various devices mounted in the vehicle, the wire harness WH bundles a plurality of wiring members W used for power supply and signal communication into an assembled component, and connects the wiring members W to the devices via a connector or the like. The wire harness WH of the present embodiment includes the wiring member W, an exterior member T, and the protector 1. The wiring member W is, for example, an insulated electric wire formed by covering a core wire including a plurality of conductive metal strands bundled together, with an insulating covering. The wiring member W may be a plurality of insulated electric wires bundled together. The wiring member W may also be an insulated metal rod formed by covering a conductive metal rod with an insulating covering. The exterior member T is externally attached to the wiring member W that is inserted and wired therein so as to protect the wiring member W wired therein. The exterior member T is formed in the shape of a flexible, substantially cylindrical tube using an insulating resin material or the like. Here, the exterior member T has a bellows shape in which a corrugated shape is repeatedly and continuously formed along an extension direction (direction along a center axis), and is sometimes referred to as a corrugated tube. The protector 1 is fixed to the vehicle and holds the exterior member T, regulating a wiring route of the wiring member W. The wire harness WH may further include various constituent components such as a grommet, an electrical junction box, a fixture, and a connector.

In such a configuration, the protector 1 according to the present embodiment includes a holding member 10, a fixing member 20, and a tubular member 30. The holding member 10 and the fixing member 20 include columnar structures 12 and 22 that are fitted into the tubular member 30. With this configuration, the protector 1 according to the present embodiment enhances versatility by connecting and integrating the holding member 10 and the fixing member 20 via the tubular member 30. Hereinafter, the configuration of the protector 1 will be described in detail with reference to FIGS. 1 to 8.

Figure 2:
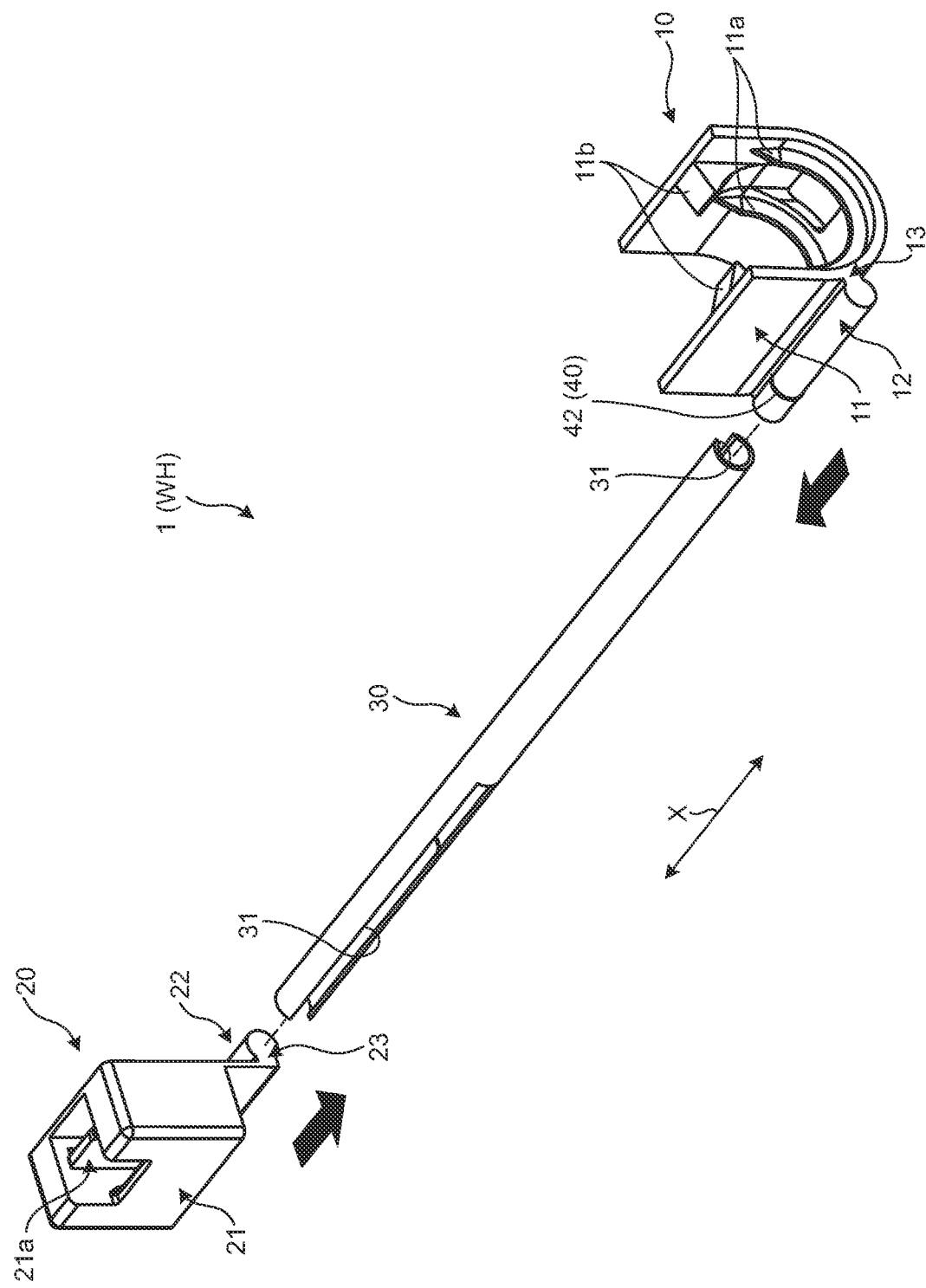
FIG. 2 is a schematic exploded perspective view illustrating a schematic configuration of a protector according to the embodiment.
Figure 3:
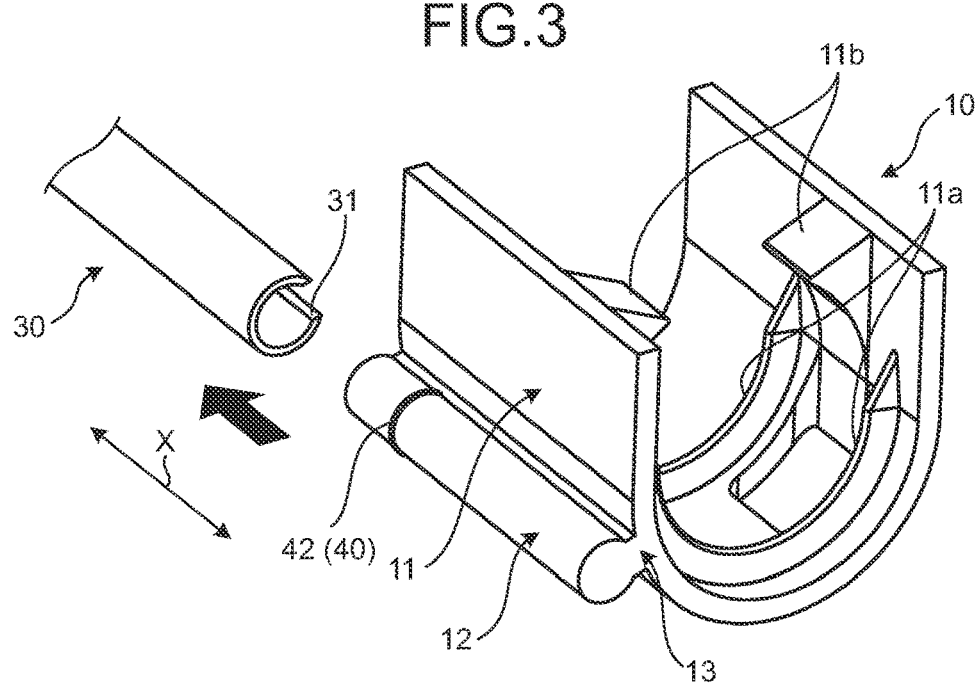
FIG. 3 is a schematic partial exploded perspective view illustrating the schematic configuration of the protector according to the embodiment.

As illustrated in FIGS. 1, 2, and 3, the holding member 10 is a member that holds the exterior member T having the wiring member W inserted therethrough. The holding member 10 includes a main body 11, the columnar structure 12, and a connecting portion 13, which are integrally formed by an insulating resin material or the like.

The main body 11 is a main portion of the holding member 10 for holding the exterior member T. The main body 11 is formed in the shape of a substantially U-shaped gutter or substantially C-shaped gutter so as to hold the exterior member T on its inner surface. The main body 11 has a biting structure 11a and a stopper structure 11b on the inner surface. The biting structure 11a is including projections formed in a substantially arc shape along the inner surface of the main body 11. The biting structure 11a prevents displacement of the exterior member T from the main body 11 with the projections biting the bellows shape (corrugated shape) on an outer surface of the exterior member T held in the main body 11. Meanwhile, the stopper structure 11b is including projecting portions formed on the inner surface of the main body 11. The stopper structure 11b prevents escape of the exterior member T from the main body 11 with the projecting portions pressing the outer surface of the exterior member T held in the main body 11.

The columnar structure 12 is a portion that is formed in a columnar shape and can be slidingly fitted into the tubular member 30. Here, the columnar structure 12 is formed in the shape of a substantially circular column with its center axis extending along a wiring direction X of the wiring member W. The columnar structure 12 is disposed at a corner portion where a bottom surface and a side surface intersect in the main body 11 formed in the gutter shape. The columnar structure 12 extends over the entire length (length along the wiring direction X) of the main body 11.

The connecting portion 13 intervenes between the main body 11 and the columnar structure 12, connecting the main body 11 and the columnar structure 12. The connecting portion 13 connects the corner portion of the main body 11 and the columnar structure 12 in a positional relationship in which the center axis of the columnar structure 12 extends along the wiring direction X as described above.

Figure 8:
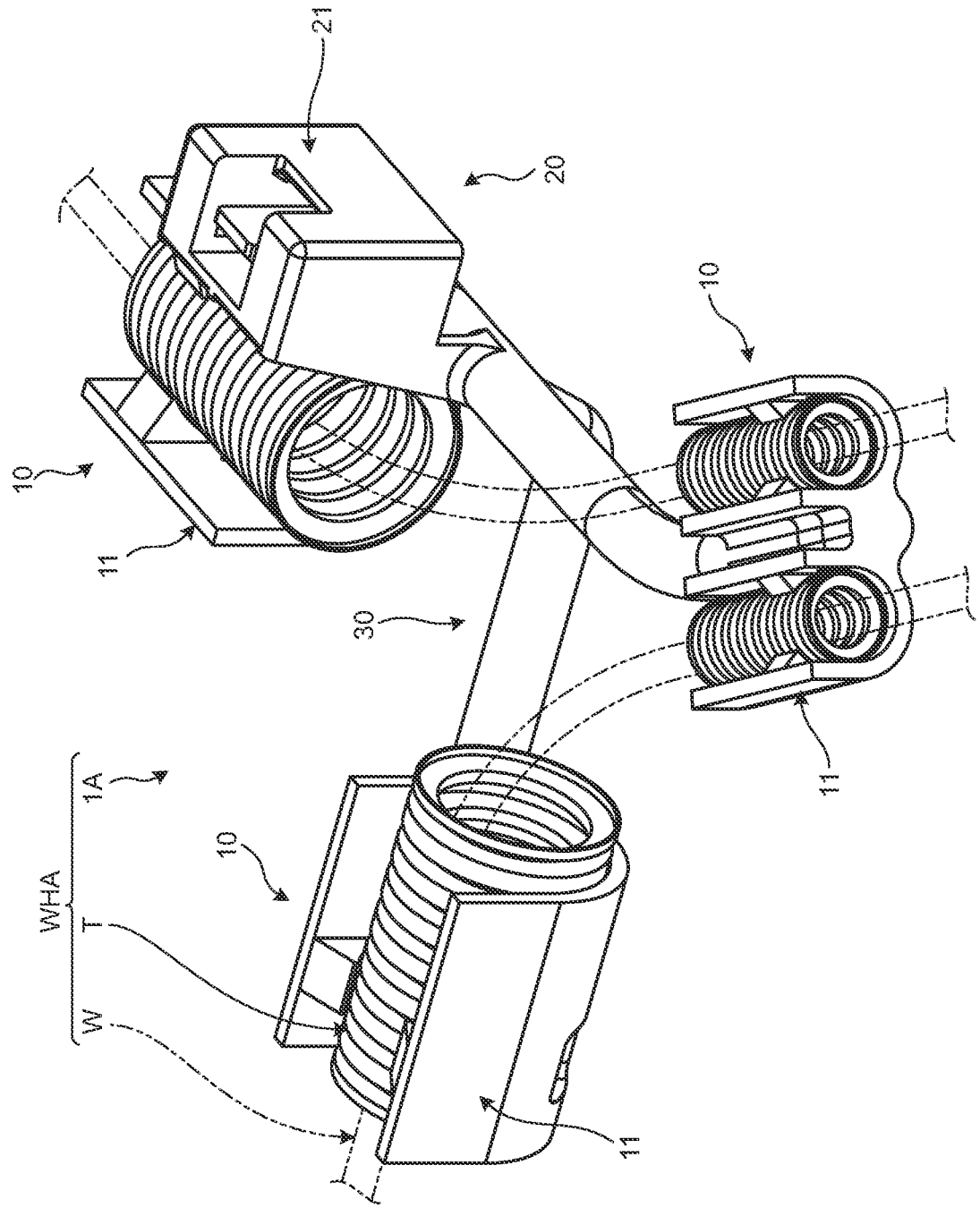
FIG. 8 is a schematic perspective view illustrating a variation of the wire harness according to the embodiment.

The holding member 10 is available in a plurality of variations depending on the outer diameter, the number, or the like of the exterior member T held in the main body 11, for example, as in a protector 1A of a wire harness WHA illustrated as one variation in FIG. 8. As one example of the variations, the holding member 10 may include the main body 11 formed integrally with the fixing member 20. The holding member 10 is selected from the variations as appropriate to be used actually according to the vehicle model, required specifications, or the like. Additionally, the number of the holding members 10 is not limited to one, and a plurality (three in the example of FIG. 8) of the holding members 10 may be provided as illustrated in FIG. 8. The applied number is determined appropriately according to the vehicle model, required specifications, or the like.

Figure 4:
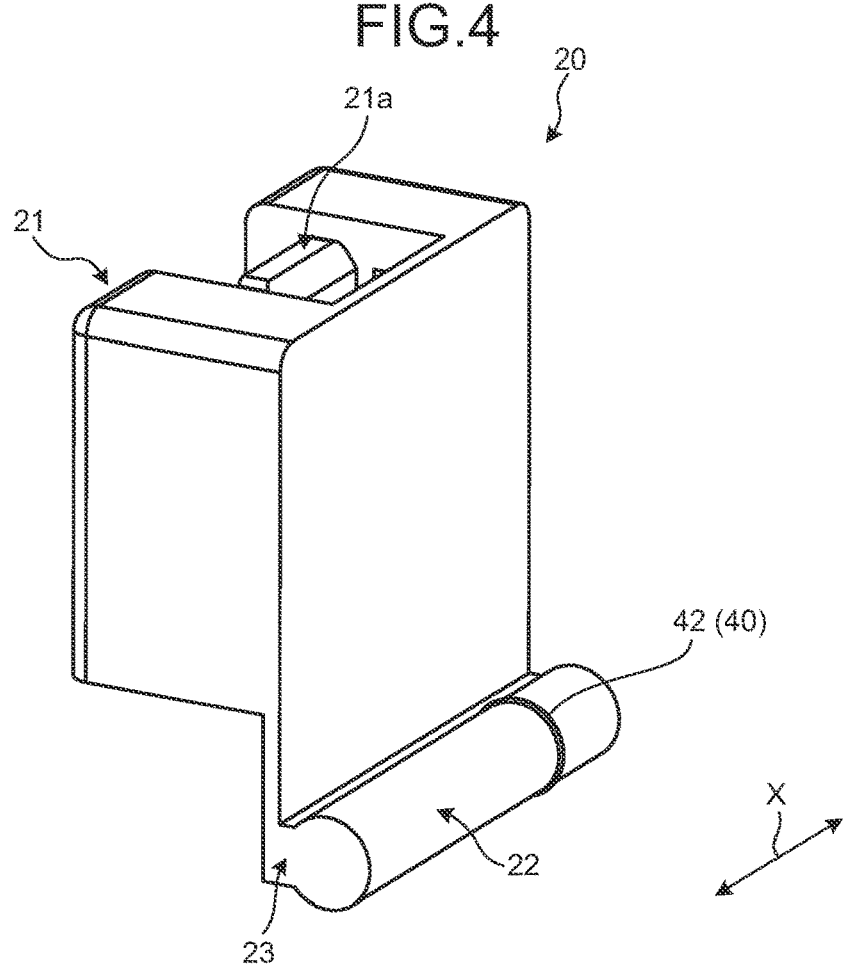
FIG. 4 is a schematic perspective view illustrating a fixing member provided in the protector according to the embodiment.
Figure 5:
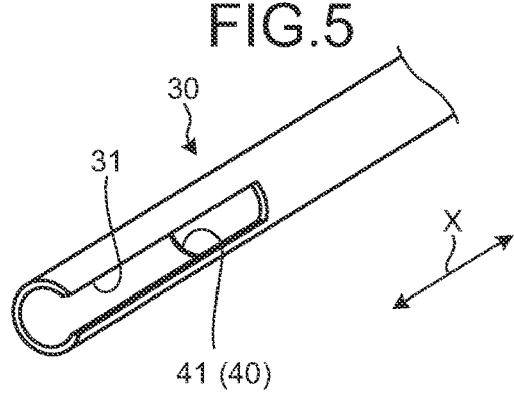
FIG. 5 is a schematic partial perspective view illustrating a tubular member provided in the protector according to the embodiment.

As illustrated in FIGS. 1, 2, and 4, the fixing member 20 is a member that is fixed to the vehicle. The fixing member 20 includes a main body 21, the columnar structure 22, and a connecting portion 23, which are integrally formed by an insulating resin material or the like.

The main body 21 is a main portion of the fixing member 20 that is fixed to the vehicle. The main body 21 is formed in the shape of a substantially square box, and is fixed to a bracket B that is disposed on a vehicle frame of the vehicle by inserting and fitting the bracket B into the main body 21. The main body 21 is configured by various known fixing structures, and is fixed to the bracket B by, for example, locking a locking hole Ba formed in the bracket B, to a locking claw 21b disposed on an arm 21a (see FIG. 1).

Similarly to the above columnar structure 12, the columnar structure 22 is a portion that is formed in a columnar shape and can be slidingly fitted into the tubular member 30. Here, the columnar structure 22 is formed in almost the same shape as the above columnar structure 12. That is, the columnar structure 22 is formed in the shape of a substantially circular column with its center axis extending along the wiring direction X of the wiring member W. The columnar structure 22 is disposed at a bottom portion of the main body 21 formed in the substantially square box shape. The columnar structure 22 extends over the entire length (length along the wiring direction X) of the main body 21.

The connecting portion 23 intervenes between the main body 21 and the columnar structure 22, connecting the main body 21 and the columnar structure 22. The connecting portion 23 connects the bottom portion of the main body 21 and the columnar structure 22 in a positional relationship in which the center axis of the columnar structure 22 extends along the wiring direction X as described above.

Similarly to the holding member 10, the number of the fixing members 20 is not limited to one, and a plurality of the fixing members 20 may be provided. The applied number is determined appropriately according to the vehicle model, required specifications, or the like.

As illustrated in FIGS. 1, 2, 3, 5, and 6, the tubular member 30 is a member that is formed in a tubular shape and on which the holding member 10 and the fixing member 20 are disposed. Here, the tubular member 30 is formed in the shape of a flexible, substantially cylindrical tube using an insulating resin material or the like. The substantially cylindrical tube of the tubular member 30 is formed in a hollow shape. The tubular member 30 extends along the wiring direction X of the wiring member W. The columnar structures 12 and 22 can be slidingly fitted into the tubular member 30 from its respective ends along the wiring direction X. The holding member 10 and the fixing member 20 are attached to the tubular member 30 via the columnar structures 12 and 22 that are slidingly fitted into the tubular member 30. The tubular member 30 thereby connects the holding member 10 and the fixing member 20, integrating them as the protector 1. The tubular member 30 includes a cutout 31 at each end. The cutout 31 extends approximately linearly from each end along a sliding direction (here, the wiring direction X) of the columnar structures 12 and 22 relative to the tubular member 30. The cutouts 31 function as portions to allow the entire holding member 10 and the entire fixing member 20 to slide when the columnar structures 12 and 22 are slidingly fitted into the tubular member 30.

The tubular member 30 is available in a plurality of variations depending on the wiring route or the like of the wiring member W, for example, as in the protector 1A of the wire harness WHA illustrated as one variation in FIG. 8. In FIG. 1, the tubular member 30 is illustrated as an I-shape (linear shape) as one of the variations. Meanwhile, in FIG. 8, the tubular member 30 is illustrated as a T-shape as another example of the variations. Examples of the tubular member 30 may further include a cruciform shape (cross shape). The tubular member 30 is selected from the variations as appropriate to be used actually according to the vehicle model, required specifications, or the like.

Figure 7:
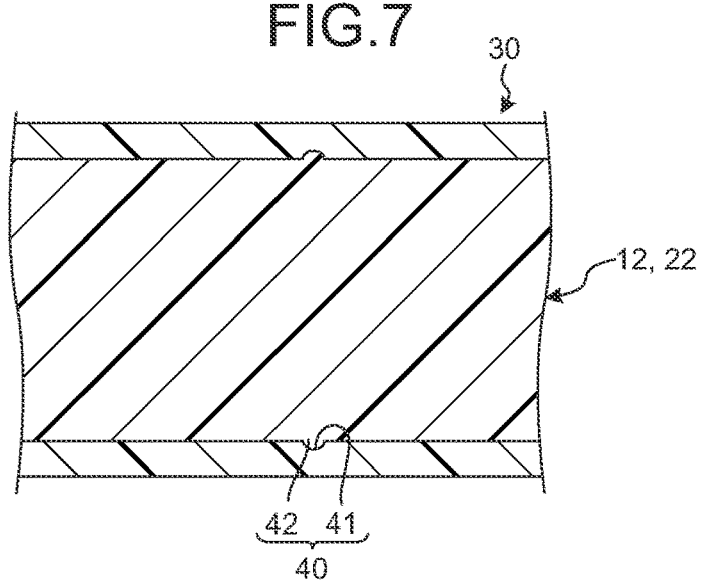
FIG. 7 is a schematic partial cross-sectional view including a locking mechanism provided in the columnar structure according to the embodiment.

The protector 1 according to the present embodiment further includes a locking mechanism 40 in addition to the above components as illustrated in FIG. 7. The locking mechanism 40 is a mechanism for fixing the columnar structure 12 (22) to the tubular member 30 in a state in which the columnar structure 12 (22) is slidingly fitted into the tubular member 30. Specifically, the locking mechanism 40 includes a recessed portion 41 and a protruding portion 42. The recessed portion 41 is formed in a recessed shape along a circumferential direction on one of an inner peripheral surface of the tubular member 30 or an outer peripheral surface of the columnar structure 12 (22). The protruding portion 42 is formed in a protruding shape along the circumferential direction on the other of the inner peripheral surface of the tubular member 30 or the outer peripheral surface of the columnar structure 12 (22). Here, the recessed portion 41 is formed on the inner peripheral surface of the tubular member 30, and the protruding portion 42 is formed on the outer peripheral surface of the columnar structure 12 (22) (see also FIGS. 2, 3, 4, and 5). In other words, the recessed portion 41 formed on the inner peripheral surface of the tubular member 30 and the protruding portion 42 formed on the outer peripheral surface of the columnar structure 12 (22) constitute the locking mechanism 40. The recessed portion 41 and the protruding portion 42 of the locking mechanism 40 are fitted to each other in a state in which the columnar structure 12 (22) is slidingly fitted into the tubular member 30. With this configuration, the locking mechanisms 40 fix the columnar structures 12 and 22 to the tubular member 30, securely positioning the holding member 10 and the fixing member 20 with respect to the tubular member 30.

Figure 6:
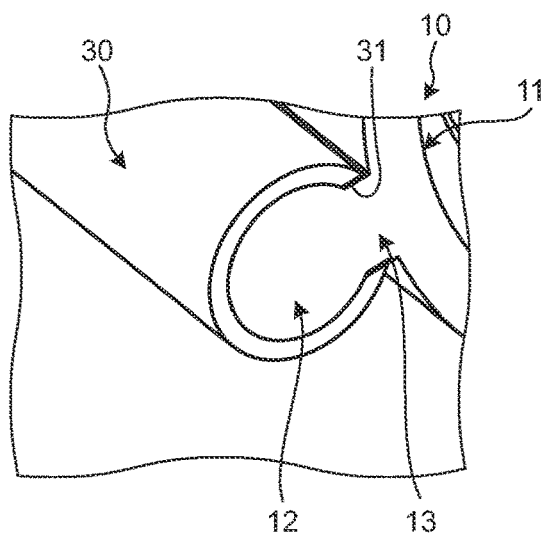
FIG. 6 is a schematic partial perspective view illustrating a fitting portion between the tubular member and a columnar structure provided in the protector according to the embodiment.

As illustrated in FIGS. 2, 3 and 6, in the protector 1 configured as described above, the holding member 10 is attached to the tubular member 30 by slidingly fitting the columnar structure 12 of the holding member 10 into the tubular member 30 from one end of the tubular member 30 along the wiring direction X. At this time, in the protector 1, the connecting portion 13 intervening between the main body 11 and the columnar structure 12 of the holding member 10 moves within the cutout 31 formed in the tubular member 30. The protector 1 thereby allows the holding member 10 to slide to a predetermined position without interfering with the tubular member 30 in slidingly fitting the columnar structure 12 of the holding member 10 into the tubular member 30. In the protector 1, the recessed portion 41 and the protruding portion 42 that constitute the locking mechanism 40 are fitted to each other as illustrated in FIG. 7, so that the columnar structure 12 can be fixed to the tubular member 30, and the holding member 10 can be securely positioned with respect to the tubular member 30.

Similarly, in the protector 1, the fixing member 20 is attached to the tubular member 30 by slidingly fitting the columnar structure 22 of the fixing member 20 into the tubular member 30 from the other end of the tubular member 30 along the wiring direction X as illustrated in FIG. 2 or the like. At this time, in the protector 1, the connecting portion 23 intervening between the main body 21 and the columnar structure 22 of the fixing member 20 moves within the cutout 31 formed in the tubular member 30. The protector 1 thereby allows the fixing member 20 to slide to a predetermined position without interfering with the tubular member 30 in slidingly fitting the columnar structure 22 of the fixing member 20 into the tubular member 30. In the protector 1, the recessed portion 41 and the protruding portion 42 that constitute the locking mechanism 40 are fitted to each other as illustrated in FIG. 7, so that the columnar structure 22 can be fixed to the tubular member 30, and the fixing member 20 can be securely positioned with respect to the tubular member 30.

In the wire harness WH, after holding the exterior member T having the wiring member W inserted therethrough, in the holding member 10 of the protector 1, the fixing member 20 is fixed to the bracket B disposed on the vehicle frame of the vehicle. The wire harness WH can thereby wire and fix the wiring member W along a wiring route in the vehicle while regulating the wiring route of the wiring member W by the protector 1. The protector 1A and the wire harness WHA illustrated in FIG. 8 are also assembled in a similar manner to the protector 1 and the wire harness WH described above.

In the protectors 1 and 1A described above, the holding member 10 and the fixing member 20 are attached to the tubular member 30 via the columnar structures 12 and 22 that are slidingly fitted into the tubular member 30. As a result, in the protectors 1 and 1A, the holding member 10 and the fixing member 20 are connected and integrated via the tubular member 30. In the wire harnesses WH and WHA, after holding the exterior member T having the wiring member W inserted therethrough, in the holding member 10, the fixing member 20 is fixed to the bracket B disposed on the vehicle frame of the vehicle. As a result, the wire harnesses WH and WHA can wire and fix the wiring member W along the wiring route in the vehicle while regulating the wiring route of the wiring member W by the protectors 1 and 1A. In this case, the protectors 1 and 1A can be configured by selecting and combining the holding member 10, the fixing member 20, and the tubular member 30 as appropriate according to the vehicle model, required specifications, wiring route, or the like. Thus, the protectors 1 and 1A can be easily formed into a desired shape according to the need.

Consequently, the protectors 1 and 1A, and the wire harnesses WH and WHA can enhance versatility. The protectors 1 and 1A, and the wire harnesses WH and WHA can thereby achieve, for example, component sharing between vehicles and cost reduction (design cost reduction and molding cost reduction), and also attain weight reduction by reducing the materials used.

The protectors 1 and 1A, and the wire harnesses WH and WHA described above also include the locking mechanisms 40 including the recessed portions 41 and the protruding portions 42. With this configuration, the locking mechanisms 40 can fix the columnar structures 12 and 22 to the tubular member 30 by fitting the recessed portions 41 and the protruding portions 42 to each other in a state in which the columnar structures 12 and 22 are slidingly fitted into the tubular member 30. As a result, the protectors 1 and 1A, and the wire harnesses WH and WHA can securely position the holding member 10 and the fixing member 20 with respect to the tubular member 30.

In the protectors 1 and 1A, and the wire harnesses WH and WHA described above, the tubular member 30 includes the cutouts 31. With this configuration, the protectors 1 and 1A, and the wire harnesses WH and WHA allow the holding member 10 and the fixing member 20 to slide without interfering with the tubular member 30 in slidingly fitting the columnar structures 12 and 22 into the tubular member 30. As a result, in the protectors 1 and 1A, and the wire harnesses WH and WHA, the holding member 10 and the fixing member 20 can be disposed at desired positions in the tubular member 30.

Note that the protector and the wire harness according to the above embodiment of the present invention are not limited to the above embodiment, and various changes can be made within the scope of the claims.

In the above description, the protectors 1 and 1A have been described as including the locking mechanisms 40 including the recessed portions 41 and the protruding portions 42. However, the protectors 1 and 1A are not limited to this configuration. For example, the protectors 1 and 1A may be configured such that the columnar structures 12 and 22 are fixed to the tubular member 30 by being press-fitted into the tubular member 30, without including the locking mechanisms 40. It has also been described that the recessed portions 41 are formed on the inner peripheral surface of the tubular member 30 and the protruding portions 42 are formed on the outer peripheral surfaces of the columnar structures 12 and 21. However, the recessed portions 41 and the protruding portions 42 are not limited to this configuration, and may be formed in a reversed configuration.

In the above description, the tubular member 30 has been described as being formed in the substantially cylindrical tube shape. However, the tubular member 30 may be formed in any tubular shape. For example, the tubular member 30 may be formed in the shape of a substantially square tube. In this case, the columnar structures 12 and 22 should also be formed in the shape of a substantially square column accordingly.

In the above description, the columnar structure 12 has been described as being disposed at the corner portion where the bottom surface and the side surface intersect in the main body 11 formed in the gutter shape, and extending over the entire length of the main body 11. However, the columnar structure 12 is not limited to this configuration, and may be disposed at another position. The same applies to the columnar structure 22.

Figure 9:
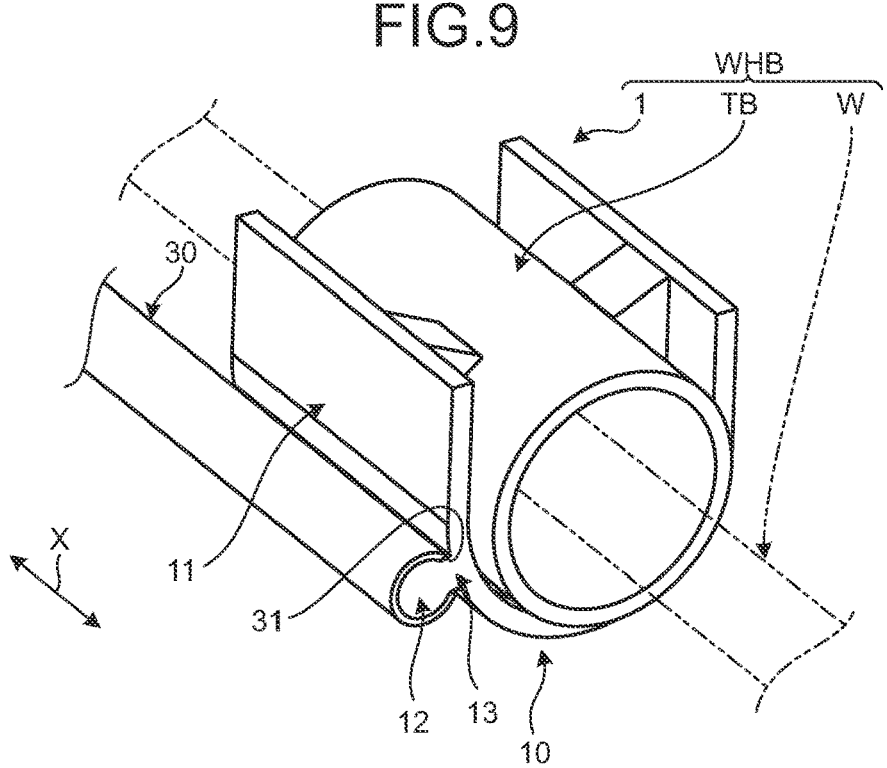
FIG. 9 is a schematic partial perspective view illustrating a schematic configuration of a wire harness according to a modification.
Figure 10:
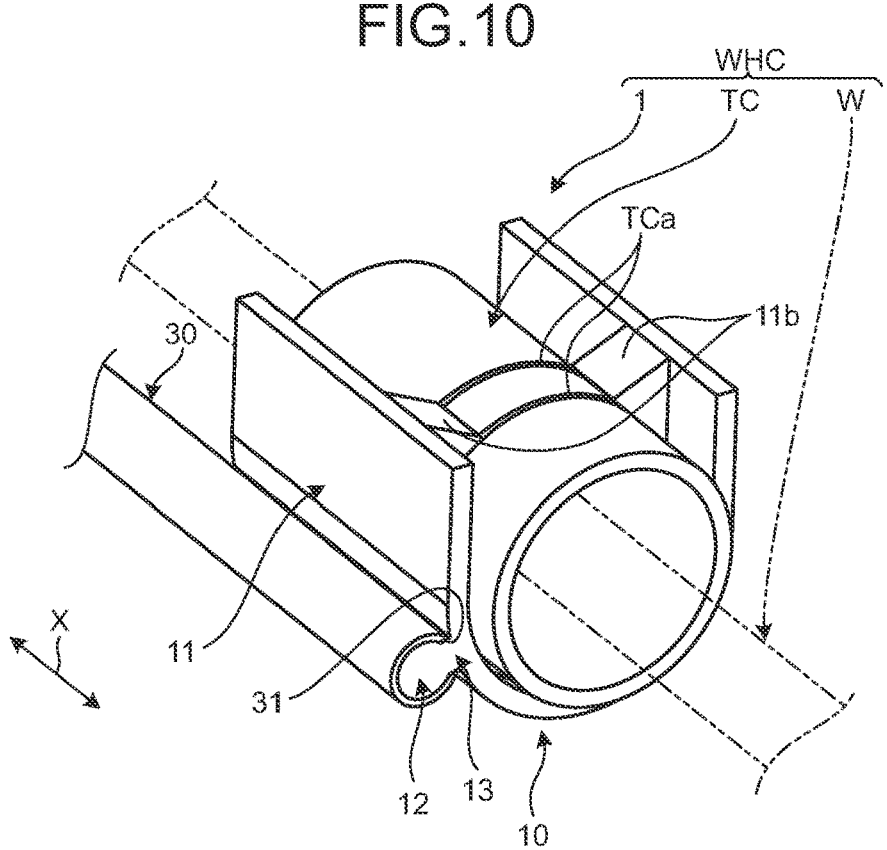
FIG. 10 is a schematic partial perspective view illustrating a schematic configuration of a wire harness according to another modification.

In the above description, the exterior member T has been described as the corrugated tube having the bellows shape in which the corrugated shape is repeatedly and continuously formed. However, the exterior member T is not limited to the corrugated tube. For example, an exterior member TB provided in a wire harness WHB according to a modification illustrated in FIG. 9 is formed in a substantially cylindrical shape having no corrugated shape. An exterior member TC provided in a wire harness WHC according to another modification illustrated in FIG. 10 is formed in a substantially cylindrical shape with grooves TCa formed in part thereof. Even in these cases, the holding member 10 can prevent escape of the exterior members TB and TC from the main body 11 by pressing the outer surfaces of the exterior members TB and TC by the stopper structure 11*b* or the like. In these cases, the wire harnesses WHB and WHC can also enhance the versatility as described above.

In the above description, the protectors 1 and 1A have been described such that both the holding member 10 and the fixing member 20 include the columnar structures 12 and 22, respectively. However, the present invention is not limited to this configuration. The protectors 1 and 1A may be configured such that at least one of the holding member 10 or the fixing member 20 includes the columnar structure 12 or 22. In this case, in the protectors 1 and 1A, the other of the holding member 10 or the fixing member 20 may be formed integrally with the tubular member 30.

Figure 11:
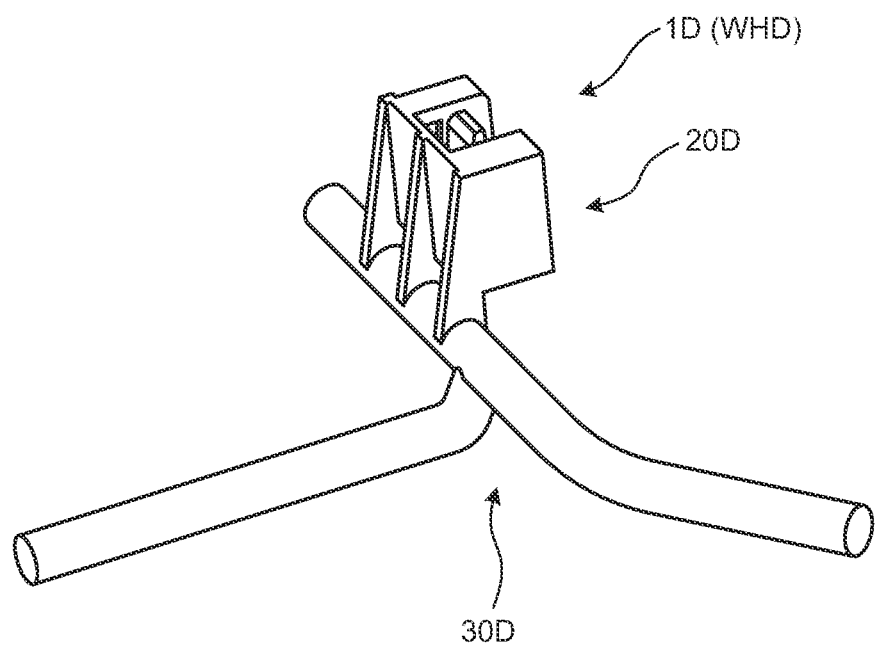
FIG. 11 is a schematic partial perspective view illustrating a schematic configuration of a wire harness according to yet another modification.
Figure 12:
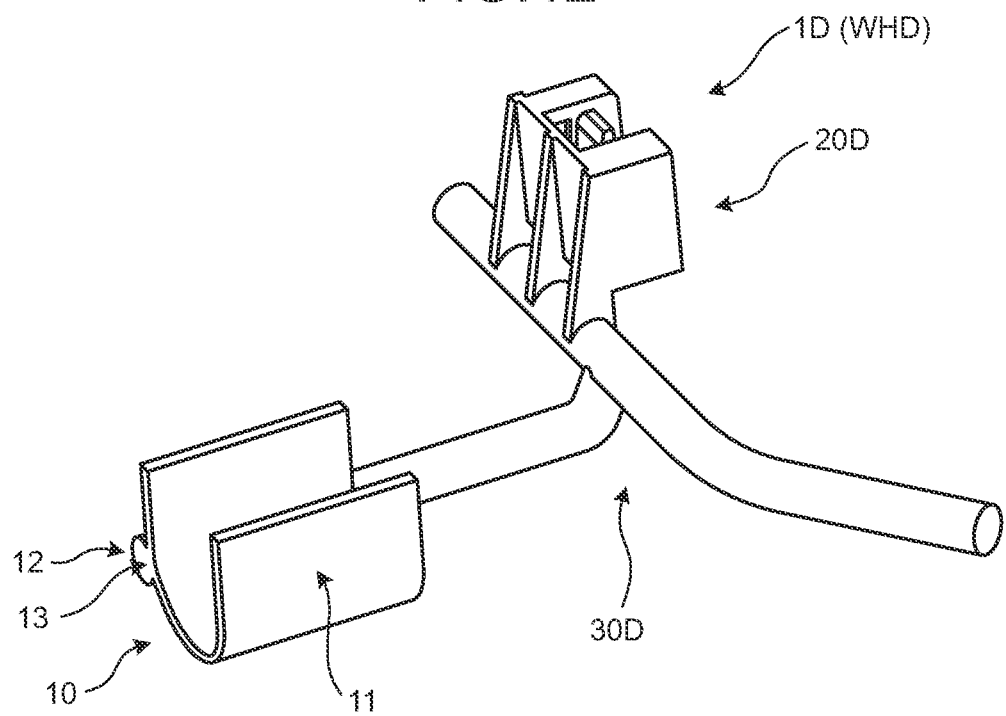
FIG. 12 is a schematic partial perspective view illustrating the schematic configuration of the wire harness according to the modification.

In a protector 1D provided in a wire harness WHD according to yet another modification illustrated in FIGS. 11 and 12, the holding member 10 includes the columnar structure 12 in the same manner as described above, while a fixing member 20D is formed integrally with a tubular member 30D. The holding member 10 is attached to the tubular member 30D by slidingly fitting the columnar structure 12 into the tubular member 30D from the end of the tubular member 30D in the same manner as described above. In this case, the protector 1D and the wire harness WHD can enhance the versatility in the same manner as described above by appropriately selecting and combining the holding member 10 formed separately from the fixing member 20D and the tubular member 30D while integrating the fixing member 20D and the tubular member 30D.

The protector and the wire harness according to the present embodiment may be configured by appropriately combining the constituent elements of the embodiment and the modifications described above.

The protector and the wire harness according to the present embodiment achieve such an effect that the versatility can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A protector comprising:
   a holding member that holds an exterior member through which a wiring member is inserted;
   a fixing member that is fixed to a vehicle; and
   a tubular member that is formed in a tubular shape and on which the holding member and the fixing member are disposed, wherein at least one of the holding member or the fixing member includes a columnar structure that is formed in a columnar shape and is slidingly fittable into the tubular member.

2. The protector according to claim 1, further comprising:
a locking mechanism including a recessed portion that is formed along a circumferential direction on one of an inner peripheral surface of the tubular member or an outer peripheral surface of the columnar structure, and a protruding portion that is formed along the circumferential direction on the other of the inner peripheral surface of the tubular member or the outer peripheral surface of the columnar structure, the recessed portion and the protruding portion being fitted to each other in a state in which the columnar structure is slidingly fitted into the tubular member.

3. The protector according to claim 1, wherein
the tubular member includes a cutout that extends along a sliding direction of the columnar structure relative to the tubular member.

4. The protector according to claim 2, wherein
the tubular member includes a cutout that extends along a sliding direction of the columnar structure relative to the tubular member.

5. The protector according to claim 1, wherein
the other of the holding member or the fixing member is formed integrally with the tubular member.

6. The protector according to claim 2, wherein
the other of the holding member or the fixing member is formed integrally with the tubular member.

7. The protector according to claim 3, wherein
the other of the holding member or the fixing member is formed integrally with the tubular member.

8. The protector according to claim 4, wherein
the other of the holding member or the fixing member is formed integrally with the tubular member.

9. A wire harness comprising:
a wiring member;
an exterior member through which the wiring member is inserted; and
a protector that is fixed to a vehicle and holds the exterior member, wherein
the protector includes:
   a holding member that holds the exterior member;
   a fixing member that is fixed to the vehicle; and
   a tubular member that is formed in a tubular shape and on which the holding member and the fixing member are disposed, and
at least one of the holding member or the fixing member includes a columnar structure that is formed in a columnar shape and is slidingly fittable into the tubular member.

* * * * *